United States Patent Office 3,285,090
Patented Nov. 15, 1966

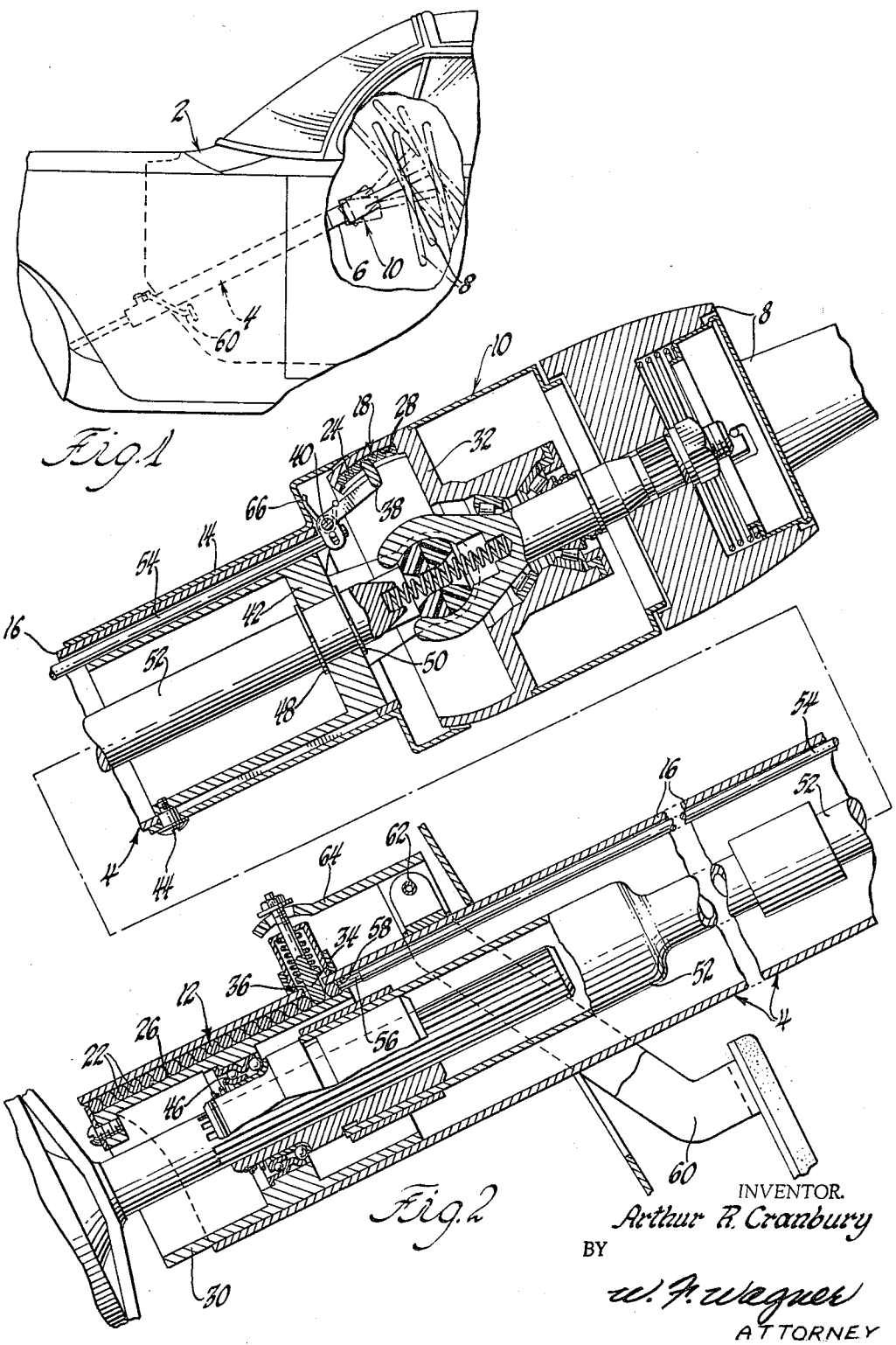

3,285,090
ADJUSTABLE STEERING COLUMN
Arthur R. Cranbury, Royal Oak, Mich., assignor to General Motors Corporation, Detroit, Mich., a corporation of Delaware
Filed May 20, 1965, Ser. No. 457,283
6 Claims. (Cl. 74—493)

The present invention is directed to improvements in the adjustable steering mechanism disclosed in copending application Serial No. 391,086, Earl W. Glover and Robert D. Wight, filed August 21, 1964, and assigned to General Motors Corporation.

This invention relates generally to adjustable steering assemblies of the tilt and telescope type, and more particularly, although not exclusively, to compound incremental latching mechanisms for such steering assemblies.

An object of the invention is to provide improved compound incremental latching mechanisms especially adapted for adjustable steering column assemblies of the type intended for adjustment both with respect to axial movement of the column and tilting movement of the portion to which the steering wheel is attached.

Another object is to provide an adjustable steering column assembly incorporating locking or latching means of the plunger and slot type wherein two such latching mechanisms, although displaceable relative to each other, are controlled by a single actuating member.

A still further object is to provide an arrangement of the stated character wherein locking and releasing of the second mechanism is a direct function of locking and releasing the first mechanism.

A still further object is to provide compound latching means of the general type described which is adaptable to structures involving both linear and arcuate relative displacement.

These and other objects, advantages and features of the invention will become more readily apparent as reference is had to the accompanying specification and drawing wherein:

FIGURE 1 is a fragmentary schematic view of a vehicle equipped with a tilting and telescoping steering column assembly incorporating the invention; and FIGURE 2 is an enlarged sectional elevational view of the steering column assembly illustrating the form and relationship of the parts thereof.

In the previously noted application Serial No. 391,086, there is shown a tilt and telescoping steering column assembly in which incremental latching mechanisms are provided which independently regulate the telescoped portion of the main steering column and the angular position of the upper portion of the assembly to which the steering wheel is attached. Since the general arrangement and structure of the present invention is identical, except as hereinafter noted, with that disclosed in the indicated application, the following description will be limited only to those features of structure and function essential to an understanding of the improvement herein involved. For a more comprehensive description of the details of the remaining structure, reference may be had to the indicated copending application.

Referring now to the drawing and particularly FIGURE 1, reference numeral 2 generally designates a vehicle body in which is disposed an adjustable steering column assembly 4 adapted for tilting and telescoping adjustment wherein a portion 6 of the column is axially telescopeable to vary the length thereof, while the steering wheel 8 and hub portion 10 thereof are tiltable relative to column 6 about a transverse axis fixed with respect to the upper portion of the column. In practice, the two modes of adjustment described enable the vehicle operator to select the most convenient elevation and angularity of the steering wheel to assure maximum comfort and freedom from fatigue. In order to obtain simplified operation and hence optimum benefits from the compound adjustment available in an assembly of this type, it is desirable that the locking and releasing mechanism associated with each mode of adjustment be susceptible of actuation by a single control member. According to the present invention, all of the advantages of the plunger and slot latching mechanism shown in copending application S.N. 391,086 are retained, while operation thereof is accomplished by a common control member.

As seen best in FIGURE 2, the steering column assembly 4 includes a first incremental latching assembly 12 which regulates the axial position of an upper column portion 14 relative to a fixed column portion 16, and a second incremental latching mechanism 18 which regulates the angular position of adjustment of the steering wheel 8 and hub portion 10 which is pivotally mounted on upper portion 14. As described in detail in the aforementioned copending application, both incremental latching assemblies are of the type wherein a series of rollers 22 and 24 are disposed respectively in recess tracks or slots 26 and 28 formed in lower cylindrical support 30 and upper housing 32, respectively, so as to occupy the entire length thereof less one roller. Reciprocably mounted on the fixed column 16 perpendicular to the axis thereof is a spring pressed plunger 34 which extends through an aperture 36 into track 26 to occupy a linear space therein equal to the diameter of one of the rollers 22. Mechanism 18 in turn coacts with a spring biased plunger element 38 pivotally mounted at 40 on upper cylindrical support 42 which in turn is keyed to telescoping portion 14 by machine screw 44. Support 42 in turn is maintained in fixed axial spacing from support 30 by thrust bearing 46 and thrust washers 48 and 50 keyed to steering shaft 52. Plunger 38 is actuated in an arcuate path which causes it to alternately withdraw from and extend into track 28 responsive to reciprocal linear movement of a rod 54, the lower end 56 of which is piloted in a longitudinally extending bore 58 formed in the upper end wall of track 26.

According to the principal feature of the invention, engagement and disengagement of both latching assemblies 12 and 18 are accomplished as a concurrent function of depressing a depending pedal element 60 which is pivotally mounted on fixed column 16 at 62. Pedal 60 includes a lever element 64 which is operatively connected to plunger 34 so that the latter is withdrawn perpendicularly from track 26 when pedal 60 is depressed. When thus withdrawn, the telescoping portion 14 of the column and the lower support 30 in which the track 26 is formed are moved as a unit within fixed column 16 to a new axial position of adjustment which is positively maintained thereafter by releasing pedal 60 and permitting the plunger 34 to re-enter track 26. Concurrent with the operation of incremental latching mechanism 12 just described, when the plunger 34 is withdrawn by operation of pedal 60, the space evacuated thereby permits the piloted end 56 of rod 54 to extend axially into track 26 responsive to the biasing force produced by spring 66 sufficient to withdraw plunger 38 from perpendicular intersecting engagement with track 28. In consequence, during the period in which pedal 60 is depressed, the steering wheel 8 and hub portion 10 are freed for angular adjustment, either simultaneously with or independently of adjustment of telescoping portion 14 relative to fixed portion 16. Conversely, when the pedal 60 is released, re-entrance of plunger 34 into track 26 not only establishes an axial position of adjustment of telescoping portion 14 but also axially displaces the piloted end 56 of rod 54 upwardly to cause re-entrance of plunger 38 into track 28 to re-establish an adjusted position of the steering wheel 8.

From the foregoing it will be seen that the present invention retains all of the structural and functional advantages of the construction shown in copending application S.N. 391,086, while providing the additional advantage of single control actuation of both modes of adjustment.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In an adjustable steering column assembly including a first portion disposed in a fixed position, a second portion telescopingly movable relative to said first portion, and a third portion angularly movable relative to said second portion, first incremental latching means operative to establish a plurality of fixed axial positions of adjustment of said second portion relative to said first portion, second incremental latching means operative to establish a plurality of fixed angular positions of adjustment of said third portion relative to said second portion, latch operating means mounted on said fixed portion, and means responsive to operation of said first incremental latching means for imparting corresponding operation to said second incremental latching means.

2. A compound latch mechanism comprising, a first fixed member, a second member movable relative to said first member, and a third member movable relative to said second member, said second and third members each having an elongated recess formed therein, a plurality of rollers caged in each of said recesses occupying less than the length thereof and movable in the direction of elongation, said first member having a reciprocable plunger mounted thereon movable perpendicularly into the recess in said second member to intersect the path of movement of said rollers and dimensioned so as to occupy a space equal to the difference between the space occupied by said rollers and the length of said recess, said second member having a reciprocable plunger mounted thereon movable perpendicularly into the recess in said third member to intersect the path of movement of said rollers and dimensioned so as to occupy a space equal to the difference between the space occupied by said rollers and the length of said last mentioned recess, axially displaceable means on said first member operatively connected at one end to said last mentioned plunger, said means including an opposite end portion reciprocably disposed in said first mentioned elongated recess in alignment with the path of movement of the rollers confined therein.

3. A compound latch mechanism comprising, first, second and third relatively movable members, said second and third members each having an elongated recess formed therein, a plurality of rollers caged in each of said recesses occupying less than the length thereof and movable in the direction of elongation, said first member having a plunger mounted thereon movable perpendicularly into the recess in said second member to intersect the path of movement of said rollers therein and occupying the remaining space, said second member having a reciprocable plunger pivotally mounted thereon movable into the recess in said third member to intersect the path of movement of said rollers and occupying the remaining space, a rod on said first member operatively connected at one end to said last mentioned plunger, said rod including an opposite end portion reciprocably disposed in said first mentioned elongated recess in alignment with the path of movement of the rollers confined therein.

4. The structure set forth in claim 3 including operating means for said first mentioned plunger.

5. The structure set forth in claim 4 including first yieldable biasing means urging said first plunger into the associated recess and second yieldable biasing means urging said second plunger out of the associated recess.

6. The structure set forth in claim 5 wherein the force of said first biasing means exceeds the force of said second biasing means.

No references cited.

MILTON KAUFMAN, *Primary Examiner.*